Figure 1:
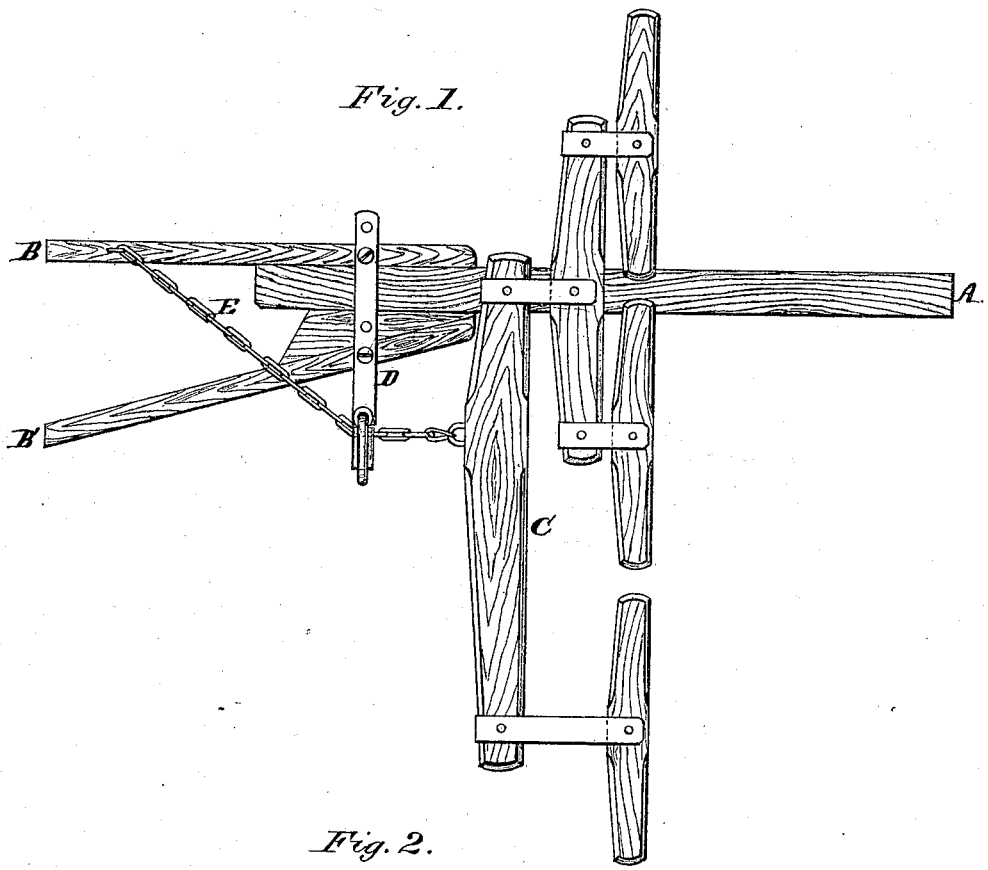

J. M. SMITH.
DRAFT DEVICE FOR HARVESTERS.

No. 109,353. Patented Nov. 15, 1870.

Witnesses: Inventor
S. J. Noyes John M Smith by
J. P. Theodore Lang H. W. Beadle, atty

United States Patent Office.

JOHN M. SMITH, OF JERSEYVILLE, ILLINOIS.

Letters Patent No. 109,353, dated November 15, 1870.

IMPROVEMENT IN DRAFT DEVICES FOR HARVESTERS.

The Schedule referred to in these Letters Patent and making part of the same.

*To all whom it may concern:*

Be it known that I, JOHN M. SMITH, of Jerseyville, in the county of Jersey and State of Illinois, have invented a new, useful, and improved Draft Device for Reapers; and I do hereby declare that the following is a full and exact description of the same, reference being had to the accompanying drawing and to the letters of reference marked thereon.

This invention consists of a bar of peculiar construction, which is employed, in connection with the frame of a reaper and the ordinary tripletree, for the purpose of permitting the attachment of three horses directly to the reaper in the place of four hitched in pairs, as usually employed.

In the drawing—

Figure 1 represents a plan view of my invention, and

Figure 2:
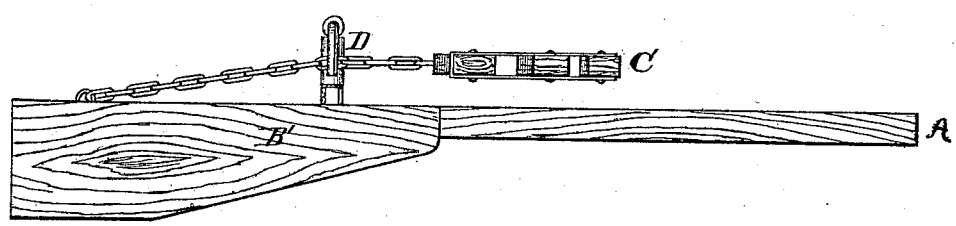

Figure 2, a side elevation of the same.

To enable others skilled in the art to make and use my invention, I will now proceed to describe fully its construction and method of operation.

A represents the draft-pole.

B B', the front part of a McCormick reaper-frame.

C, an ordinary tripletree.

D represents an iron bar, which is secured to arms B B' by bolts or screws, or other convenient fastening. The right end of this bar is bent in clevis-shape, to form a guide for the chain, and is provided with rollers, as shown.

E represents the draft-chain, which is attached to the tripletree and to any convenient part of the frame.

The bar D, it will be observed, is furnished with a series of holes, by means of which it may be adjusted laterally upon the frame, for the purpose of bringing the horses into any desired position.

The advantages of employing three horses abreast, in place of four, in pairs, are evident. The draft is more equally distributed between them, and they are more perfectly under the driver's control. It is believed that an equal or nearly equal amount of work can be accomplished by means of this device as is accomplished by the old method, although one less animal is employed. By connecting the draft to the frame of the machine instead of to the pole, the point of attachment may be varied to suit the necessities of the case.

Having thus fully described my invention,

What I claim as new, and desire to secure by Letters Patent of the United States, is—

The adjustable bar D, constructed specifically as described, with its rollers, in combination with frame, chain, and tripletree, as and for the purpose described.

This specification signed and witnessed this 29th day of August, 1870.

JOHN M. SMITH.

Witnesses:
W. Y. CHUNTZULTT.
M. L. HILL.